United States Patent Office 3,296,109
Patented Jan. 3, 1967

3,296,109
INSOLUBILIZATION OF CELLULOSIC
SUBSTANCES
Frederick C. Leavitt, Wellesley, Mass., assignor to The
Dow Chemical Company, Midland, Mich., a corporation of Delaware
No Drawing. Filed Sept. 28, 1962, Ser. No. 227,072
9 Claims. (Cl. 204—160.1)

This invention relates to cellulosic materials, and is more particularly concerned with a novel process for the irradiation of certain water-soluble cellulosic materials in the presence of water and the insolubilized cross-linked products prepared thereby. The present application is a continuation-in-part of my original application, Serial No. 26,943, filed May 5, 1960.

United States Patent No. 2,895,891 teaches that cellulosic materials may be treated with high energy ionizing radiation in the presence of water to effect cross-linking and insolubilization of the cellulosic material, providing the energy utilized during irradiation is equivalent to at least 50,000 electron volts with a radiation dose in the range of $1 \times 10^6 - 1 \times 10^8$ Roentgen equivalent physical units (rep.).

It has now been unexpectedly discovered that with appropriate process modifications, appreciably lower doses of irradiation can be used to produce cross-linking in certain water-soluble cellulosic materials, particularly nonionic, water-soluble ethers of cellulose. By utilizing dosage rates and reaction conditions specified hereinafter, the cellulose ethers can be substantially cross-linked with much less radiation power than that required by former processes. The importance of this discovery, at least with respect to the radiation power savings effected, will be manifested by the fact that highly cross-linked gels can be produced in the present invention with a total dosage that may be as little as 25 percent or less of the minimum dosage specified in the aforementioned patent. Cross-linked cellulosic materials, formed in this manner, are highly useful as water-insoluble fibers, tapes, fabrics and the like.

In accordance with the present invention, it has been discovered that cross-linking and insolubilization of water-soluble, nonionic cellulose ethers is accomplished by irradiating an aqueous solution of a cellulose ether, made up as hereinafter specified, with high energy electrons at or above a minimum dose rate of about $0.4 \times 10^6$ rep./sq. cm./sec., until the ether solution has received an average dose of at least $1 \times 10^4$ rep. but not more than $0.6 \times 10^6$ rep. It is essential to the process that the solution of the cellulose derivative has a viscosity within the range from about 3 to 500 centipoises, preferably 10 to 150 centipoises at 20° C. Viscosities specified herein are determined by means of a Ubbelohde viscosimeter maintained at 20° C. in a water bath.

The total dosage of high energy electrons employed with any particular solution of a water-soluble cellulose ether will vary with the extent of insolubilization or gelation desired and the viscosity of the solution being treated. Solution viscosities within the preferred range tend to require lower doses to produce incipient gelation, while viscosities outside this range but still within the specified overall range require larger doses to produce incipient gelation. With solutions having either higher or lower viscosities than as specified above, radiation in accordance with the invention at the dosage levels specified simply tends to reduce the viscosity of the solution with little or no cross-linking.

The extent of insolubilization may vary from a stage appropriately characterized as incipient gelation, i.e., when the solution first evidences a gel-like second phase constituting a minor proportion of the total solution, up to a stage at which the composition may be characterized as a single phase, rigid shape retaining gel. While further cross-linking may be possible once a rigid gel has been obtained, continued irradiation may produce substantial cellulose degradation with little net cross-linking. In view of this fact total dosages above the specified maximum are not desirable in the practice of the present invention.

Cellulosic ethers, contemplated herein, include water-soluble, nonionic derivatives of polymers of glucose-residue units having the following structure:

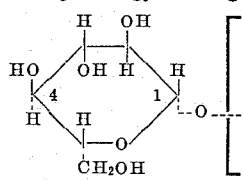 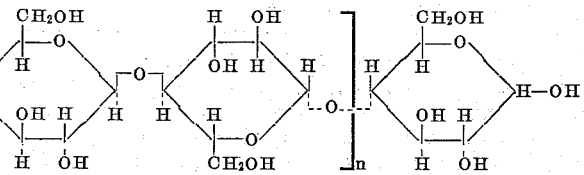

Examples of suitable cellulose derivatives are the water-soluble alkyl celluloses (e.g., methyl-, ethyl-, propyl-, etc., cellulose), hydroxyalkyl celluloses (e.g., hydroxymethyl-, hydroxyethyl-, hydroxypropyl-, etc., cellulose), alkyl hydroxyalkyl celluloses (e.g., ethyl hydroxyethyl cellulose, etc.), and the like water-soluble cellulose derivatives. The critical parameters of operable cellulose ethers are that they be water soluble and substantially free of ionic groups.

To provide aqueous solutions of cellulosic ether within the prescribed viscosity ranges, the amount of the cellulose ether in solution will generally vary within limits ranging from as little as 0.1 percent up to as much as 10 percent by weight. The viscosity of any particular solution of a cellulosic ether will depend, assuming normal room temperature conditions, upon the molecular weight of the material and the concentration of the cellulose ether in solution. In the instance of cellulose ethers, their molecular weight is usually indicated by their viscosity grade numbers. While pH control is not essential to the process of the invention, it is preferred to operate with solutions characterized by a pH within the range from about 2 to about 11.

The high energy electron radiation employed in the practice of this invention can range from about 50,000 to 20 million electron volts or higher. Preferably, 100,000 to 10 million electron volts are utilized. The power used is sufficient to produce a dose rate of at least $0.4 \times 10^6$ rep./sq. cm./sec. Such dose rates can be conveniently achieved with electron beam currents of as little as about 50 microamperes to as much as 225 microamperes, or more. Such energy may be supplied and administered with known equipment and techniques for accomplishing high energy electron radiation. Examples of such techniques and equipment are outlined in U.S. Patents 2,895,891 and 2,907,704.

Following irradiation, utilizing the types, amounts and rates of dosages described hereinbefore, the gelled solution of the cross-linked cellulose ether may then be dehydrated with any suitable tcehnique such as heat, air, reduced pressure, filtration, decantation, and combinations thereof for subsequent uses requiring a water-insolubilized polymeric material.

The following examples are given as a means for describing the invention, but are not to be construed as limiting the invention thereto.

Example 1

Thin films were cast from a 1 percent by weight aqueous solution of hydroxyethyl cellulose (Hercules Powder Company "Natrosol," medium grade). The solution had a viscosity as measured with a Ubbelohde viscosimeter at 20° C. of 150 centipoises. Prior to any significant drying, the films were subjected to irradiation with a high energy electron beam. The electron beam was supplied by a Van de Graaf accelerator operated at a beam current of 133 microamperes. The results noted with 9 film samples were as follows:

| Sample | Dose (rep.) | Dose Rate (rep./sq. cm./sec.) | Product |
|---|---|---|---|
| 1 | $0.10 \times 10^6$ | $0.77 \times 10^6$ | Mucus-like. |
| 2 | $0.16 \times 10^6$ | $0.77 \times 10^6$ | Gel-like slurry. |
| 3 | $0.21 \times 10^6$ | $0.77 \times 10^6$ | Do. |
| 4 | $0.27 \times 10^6$ | $0.77 \times 10^6$ | Do. |
| 5 | $0.32 \times 10^6$ | $0.77 \times 10^6$ | Do. |
| 6 | $0.37 \times 10^6$ | $0.77 \times 10^6$ | Do. |
| 7 | $0.43 \times 10^6$ | $0.77 \times 10^6$ | Do. |
| 8 | $0.48 \times 10^6$ | $0.77 \times 10^6$ | Do. |
| 9 | $0.54 \times 10^6$ | $0.77 \times 10^6$ | Do. |

Additional film samples 10–12, prepared as above, were subjected to irradiation, vacuum filtration, and drying to measure the percentage of gelation, i.e., percent of original cellulose ether insolubilized. Radiation of the samples was carried out as described above, except that Sample 10 was subjected to a beam current of 225 microamperes. The results were as follows:

| Sample | Dose (rep.) | Dose Rate (rep./sq. cm./sec.) | Gel (percent) |
|---|---|---|---|
| 10 | $0.27 \times 10^6$ | $1.27 \times 10^6$ | 64 |
| 11 | $0.43 \times 10^6$ | $0.77 \times 10^6$ | 64 |
| 12 | $0.48 \times 10^6$ | $0.77 \times 10^6$ | 73 |

Example 2

In a manner identical to the foregoing Example 1 thin films were cast from an aqueous solution of hydroxyethyl cellulose (Hercules Powder Company "Natrosol," medium grade). The solution contained 1 percent by weight of the cellulose ether. Three films prepared from this solution were subjected to irradiation in a beam of high energy electrons at varying beam currents. The results noted were as follows:

| Sample | Dose (rep.) | Current ($\mu$amperes) | Dose Rate (rep./sq. cm./sec.) | Product |
|---|---|---|---|---|
| 1 | $0.27 \times 10^6$ | 225 | $1.27 \times 10^6$ | Rigid gel. |
| 2 | $0.27 \times 10^6$ | 150 | $0.84 \times 10^6$ | Do. |
| 3 | $0.27 \times 10^6$ | 100 | $0.56 \times 10^6$ | Gel-like slurry. |

Example 3

Thin films were cast from a 1 percent by weight aqueous solution of methyl cellulose having a viscosity of 10 centipoises (Dow "Methocel," viscosity grade of 51 cps.). The films were segregated into five samples, and, prior to drying, subjected to irradiation with high energy electrons at varying beam currents. The results noted were as follows:

| Sample | Dose (rep.) | Dose Rate (rep./sq. cm./sec.) | Product |
|---|---|---|---|
| 1 | $0.27 \times 10^6$ | $1.27 \times 10^6$ | Gel-like slurry. |
| 2 | $0.27 \times 10^6$ | $0.84 \times 10^6$ | Do. |
| 3 | $0.27 \times 10^6$ | $0.56 \times 10^6$ | Mucus-like. |
| 4 | $0.27 \times 10^4$ | $0.28 \times 10^6$ | No gel. |
| 5 | $0.27 \times 10^6$ | $0.06 \times 10^6$ | Do. |

Example 4

A thin film was cast from a 2 percent by weight aqueous solution of ethyl hydroxyethyl cellulose having a viscosity of 100 centipoises (Mo Och Domsjo Aktiebolagta "Modocoll" Grade E-100). The aqueous film was subjected to irradiation with a high energy electron beam at a beam current of 133 microamperes. The result noted was as follows:

Dose (rep.) _____ $0.54 \times 10^6$
Dose rate (rep./sq. cm./sec.) _____ $0.77 \times 10^6$
Product _____ Rigid gel In a manner similar to that of the foregoing examples, thin films of water solutions of a methyl hydroxypropyl cellulose, said solutions having viscosities within the range from about 3 to about 500 centipoises, are irradiated with high energy electrons at a dose rate of at least about $0.4 \times 10^6$ rep./sq. cm./sec. sufficiently to provide an average dosage of at least $1 \times 10^4$ rep., preferably $0.1 \times 10^6$ rep., but not more than $0.6 \times 10^6$ rep., whereby a gelled solution is obtained. Likewise, the cellulosic ethers described in the foregoing examples are insolubilized in the form of aqueous solutions containing from about 0.1 to about 10 percent by weight of the cellulosic ether by irradiating large volumes of the solutions under gentle agitation. Irradiation is carried out in the manner set forth above at a dose rate in excess of $0.4 \times 10^6$ rep./sq. cm./sec. until the solution has absorbed an average dose of at least $0.1 \times 10^6$ rep. but not more than $0.6 \times 10^6$ rep. whereby a gelled slurry is obtained.

Various modifications may be made in the present invention, without departing from the spirit or scope thereof, and it is to be understood that I limit myself only as defined in the appended claims.

I claim:

1. In a process for cross-linking water-soluble, nonionic cellulose ethers which comprises subjecting an aqueous solution of such a cellulose ether to radiation in the form of high energy electrons, the improvement which consists in providing the cellulose ethers to be irradiated in the form of an aqueous solution having a viscosity within the range from about 3 to 500 centipoises and irradiating the solution with high energy electrons at a dose rate of at least $0.4 \times 10^6$ rep./sq. cm./sec. to provide a total dose within the range from about $1 \times 10^4$ to about $0.6 \times 10^6$ Roentgen equivalent physical units.

2. The process of claim 1 wherein the cellulose ether is an alkyl cellulose.

3. The process of claim 2 wherein the alkyl cellulose is methyl cellulose.

4. The process of claim 1 herein the cellulose ether is a hydroxyalkyl cellulose.

5. The process of claim 4 wherein the hydroxyalkyl cellulose is hydroxyethyl cellulose.

6. The process of claim 1 wherein the cellulose ether is an alkyl hydroxyalkyl cellulose.

7. The process of claim 6 wherein the alkyl hydroxyalkyl cellulose is ethyl hydroxyethyl cellulose.

8. In a process for cross-linking water-soluble, nonionic cellulose ethers which comprises subjecting a thin film of an aqueous solution of such a cellulose ether to radiation in the form of high energy electrons, the improvement which consists in providing the cellulose ethers to be irradiated in the form of an aqueous solution having a viscosity within the range from about 3 to 500 centipoises and irradiating the solution with high energy electrons at a dose rate of at least $0.4 \times 10^6$ rep./sq. cm./sec. to provide a total dose within the range from about $1 \times 10^4$ to about $0.6 \times 10^6$ Roentgen equivalent physical units.

9. In a process for cross-linking water-soluble, nonionic cellulose ethers which comprises subjecting an aqueous solution of such a cellulose ether, at a pH within the range from about 2 to about 11, to radiation in the form of high energy electrons, the improvement which consists in providing the cellulose ether to be irradiated in the form of an aqueous solution having a viscosity within the range from about 3 to 500 centipoises and irradiating the solution with high energy electrons at a dose rate of at least $0.4 \times 10^6$ rep./sq. cm./sec. to provide a total dose within the range from about $1 \times 10^4$ to about $0.6 \times 10^6$ Roentgen equivalent physical units.

References Cited by the Examiner
UNITED STATES PATENTS
2,895,891   7/1959   Miller _____ 204—154

MURRAY TILLMAN, *Primary Examiner.*
W. L. BASCOMB, JR., *Examiner.*
N. F. OBLON, *Assistant Examiner.*